United States Patent Office 2,742,560
Patented Apr. 17, 1956

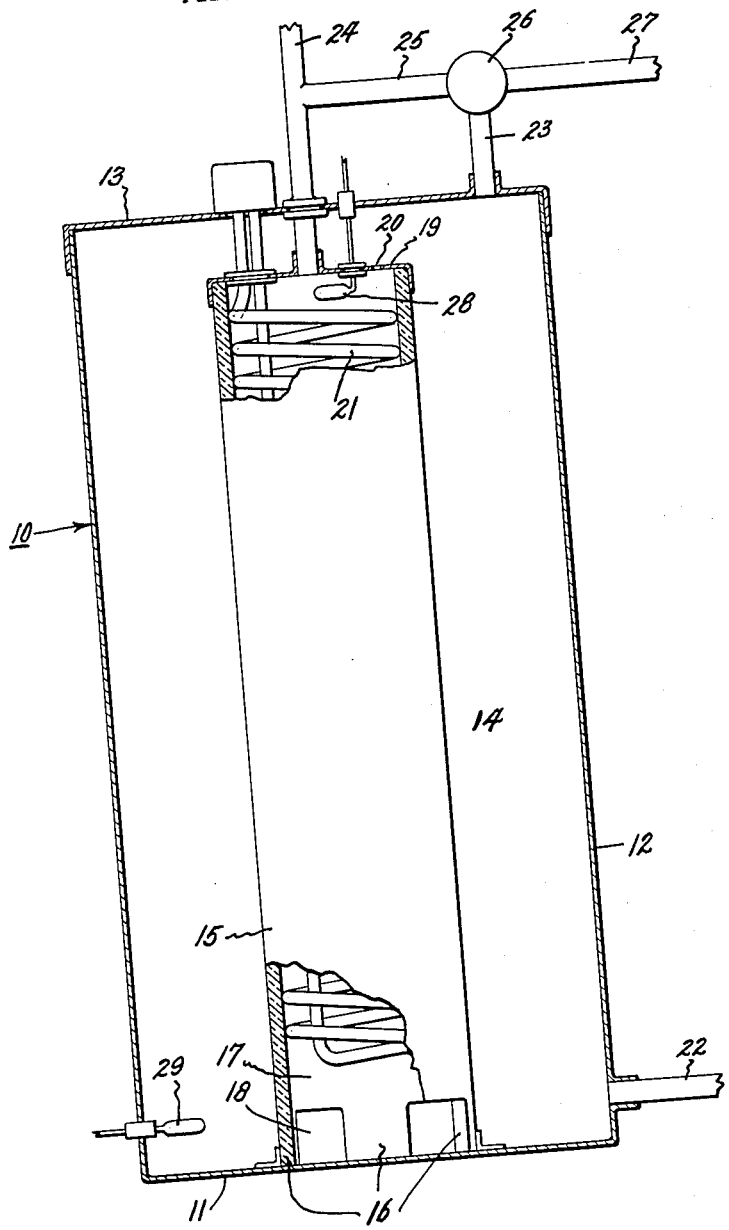

---

2,742,560

WATER HEATER

Herman A. Liebhafsky, Schenectady, N. Y., assignor to General Electric Company, a corporation of New York Application October 29, 1954, Serial No. 465,462

4 Claims. (Cl. 219—38)

This invention relates to water heaters and specifically to water heaters with a variable temperature water supply.

A water heater, which provides water at variable temperature levels, is desirable in both domestic and commercial use. A conventional water heater supplies hot water at only a single temperature. Such a device is subject to corrosion which results from the hot water in contact with the metallic tank. Insulation must also be positioned around the water storage tank to prevent attendant heat loss. The invention of the present application eliminates both the corrosion and insulation problems to produce an inexpensive water heater which has a low operating cost.

Accordingly, it is an object of my invention to provide a new and improved water heater which supplies water at variable temperature levels.

It is another object of the invention to provide an improved water heater which eliminates corrosion therein.

It is a further object of the invention to eliminate the insulation which is provided in a conventional water heater.

In carrying out my invention in one form, a corrosion-resistant inner casing is positioned within an outer metallic casing to provide a water heater with a variable temperature water supply.

These and various other objects, features and advantages of the invention will be better understood from the following description taken in connection with the accompanying drawing in which the single figure is a sectional view of a water heater which embodies my invention.

In the single figure of the drawing, a water heater shown generally at 10, comprises a base 11 on which an outer casing or tank 12 with a top wall 13 is supported to define a water storage chamber 14. Base 11, casing 12, and wall 13 are preferably composed of an inexpensive metal, such as galvanized steel. An inner casing or tank 15 of a corrosion-resistant material is mounted on base 11 within casing 12 by a plurality of supports 16 to define an inner water storage chamber 17. Casing 15 is provided with an open bottom end 18 and a closed top wall 19 with vent openings 20 therein to permit the escape of accumulated gases from chamber 17. Examples of suitable corrosion-resistant materials for casing 15 and wall 19 are porcelain or plastic. A heating coil 21 is preferably positioned adjacent the entire length of the inner wall of casing 15 to operate at relatively low temperatures to minimize scaling. An increase in heating capacity of coil 21 produces a corresponding reduction in size of the inner casing.

A water inlet 22, which is shown adjacent base 11 of casing 12, admits cold water at approximately 60° F. to storage chambers 14 and 17 while outlets 23 and 24 circulate hot water therefrom. Outlet 24 communicates with chamber 17 through walls 19 and 13 to prevent a mixing of hot water from this chamber with water at ambient temperature in chamber 14. A conduit 25 connects outlet 24 to a thermostatic valve 26 to which outlet 23 is also connected to provide a mixing chamber for water from chambers 14 and 17. An outlet 27 circulates the hot water mixture from valve 26 to a water supply, such as, for example, a faucet. While hot water is supplied at about 180° F. through outlet 24, water which is circulated from outlet 27 may be varied through regulation of thermostatic valve 26. Thus, water heater 10 circulates a hot liquid supply at about 180° F. for clothes washers and dishwashers and a second supply of hot water for domestic use at approximately 120° F. Ambient temperature water in chamber 14 produces thermal insulation between casings 12 and 15 to eliminate insulation material therebetween which is normally employed. Material strength, which is provided by water in adjacent chambers 14 and 17, allows casing 15 to be constructed of a corrosion-resistant porcelain or plastic. This is important since the hottest water, the cause of corrosion, is within casing 15. Metallic casing 12 is not subjected to corrosive forces because ambient temperature water is provided therein.

Energy supply to coil 21 is controlled by a pair of thermostats 28 and 29 which are positioned within chambers 17 and 14 to determine temperature levels therein. When a maximum temperature level is reached in chamber 17, thermostat 28 shuts off the current supply to coil 21 to provide a safety device for water heater 10. If water in chamber 14 rises to the maximum value which is set by thermostat 29, no further current flows to coil 21. Thermostat 29 is desirable during a period of time, such as, for example, night in which no water is withdrawn from heater 10 to prevent a high, undesirable temperature in chamber 14 from a heat leak.

In the operation of water heater 10 which is shown in the single figure of the drawing, cold water at approximately 60° F. is admitted through inlet 22 to chambers 14 and 17 to be heated within casing 15 by coil 21 which is regulated by thermostats 28 and 29. Water within casing 15 is heated to around 180° F. to provide a hot liquid supply which is withdrawn through outlet 24. Second outlet 27 provides hot water at approximately 120° F. which is produced by a mixture of water from chambers 14 and 17 in valve 26. If it is desired, water temperature from outlet 27 may be varied through an adjustment of valve 26.

As will be apparent to those skilled in the art, the objects of my invention are attained by the use of an inner corrosion-resistant casing which is positioned within an outer metallic casing to provide a water heater with a variable temperature water supply.

While other modifications of this invention and variations of apparatus which may be employed within the scope of the invention have not been described the invention is intended to include all such as may be embraced within the following claims.

What I claim as new and desire to secure by Letters Patent of the United States is:

1. A hot water heater comprising an outer casing, a corrosion-resistant casing positioned within the outer casing, heating means within the inner casing, means positioned within each of said casings to regulate said heating means, and water inlet and outlet means for said heater.

2. A hot water heater comprising an outer casing, a corrosion-resistant casing positioned within the outer casing, heating means within the inner casing, a thermostat positioned in each of said casings to regulate said heating means, and water inlet and outlet means for said heater.

3. A hot water heater comprising an outer casing with a cold water inlet and a hot water outlet, a corrosion-resistant casing positioned within the outer casing with a cold water inlet and a hot water outlet, heating means within the inner casing, means positioned within each of said casings to regulate said heating means, a conduit communicating with said second outlet, said conduit and first outlet connected to a common outlet, and mixing means in the common outlet to provide variable temperature hot water.

4. A hot water heater comprising an outer casing with a cold water inlet and a hot water outlet, a corrosion-resistant casing positioned within the outer casing, said inner casing provided with a closed top and an open bottom, a hot water outlet for said inner casing, heating means within the inner casing, means positioned within each of said casings to regulate said heating means, a conduit communicating with said second outlet, said conduit and first outlet connected to a common outlet, and mixing means in the common outlet to provide variable temperature hot water.

References Cited in the file of this patent

UNITED STATES PATENTS

| | | |
|---|---|---|
| 1,034,952 | Ball | Aug. 6, 1912 |
| 1,047,389 | Cooper | Dec. 17, 1912 |
| 1,553,491 | Werner | Sept. 15, 1925 |
| 1,630,909 | Steere | Mar. 31, 1927 |
| 1,886,135 | Tannehill | Nov. 1, 1932 |